(12) United States Patent
Griffin

(10) Patent No.: US 10,154,029 B1
(45) Date of Patent: Dec. 11, 2018

(54) BIOMETRIC KNOWLEDGE EXTRACTION FOR MUTUAL AND MULTI-FACTOR AUTHENTICATION AND KEY EXCHANGE

(71) Applicant: Wells Fargo Bank, N.A., San Francisco, CA (US)

(72) Inventor: Phillip H. Griffin, Raleigh, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 183 days.

(21) Appl. No.: 15/169,312

(22) Filed: May 31, 2016

(51) Int. Cl.
H04L 29/06 (2006.01)
H04L 9/08 (2006.01)
G06F 17/30 (2006.01)

(52) U.S. Cl.
CPC .... *H04L 63/0861* (2013.01); *G06F 17/30867* (2013.01); *H04L 9/0861* (2013.01); *H04L 63/0428* (2013.01); *H04L 63/06* (2013.01)

(58) Field of Classification Search
CPC ............ H04L 63/0861; H04L 63/0428; H04L 9/0861; H04L 63/06; G06F 17/30867
See application file for complete search history.

(56) References Cited

U.S. PATENT DOCUMENTS

| 5,764,789 A * | 6/1998 | Pare, Jr. ............... G06F 21/32 382/115 |
| 2015/0215316 A1 * | 7/2015 | Zeljkovic ............. H04L 9/3231 726/6 |

| 2016/0203496 A1 | 7/2016 | Guerrero et al. |
| 2016/0330027 A1 | 11/2016 | Ebrahimi |
| 2017/0116615 A1 * | 4/2017 | Burgess ........... G06Q 20/40145 |

OTHER PUBLICATIONS

Accredited Standards Committee X9, Incorporated, ANSI X9.73/2010, Cryptographic Message Syntax-ASN.1 and XML, American National Standards Institute, Apr. 15, 2010, 89 pages.
Accredited Standards Committee X9, Incorporated, ANSI X9.84/2010, Biometric Information Management and Security for the Financial Services Industry, American National Standards Institute, Mar. 31, 2010, 172 pages.
Griffin, P., Biometric Knowledge Extraction for Multi-Factor Authentication and Key Exchange, Procedia Computer Sciences, vol. 61, Complex Adaptive Systems, Nov. 2-4, 2015, 6 pages.
Griffin, P., Telebiometric Authentication Objects, Procedia Computer Science, vol. 36, Complex Adaptive Systems, Philadephia, PA, Nov. 3-5, 2014, 8 pages.

(Continued)

*Primary Examiner* — Mahfuzur Rahman
(74) *Attorney, Agent, or Firm* — Foley & Lardner LLP

(57) ABSTRACT

Various embodiments relate to a method performed by a processor of a computing system. An example method includes receiving a user identifier and encrypted authentication data from a user. The encrypted authentication data includes a biometric sample encrypted using an encryption key that is generated using a previously established a user secret. The user identifier is matched with a stored user secret. The stored user secret is used to generate a decryption key. The decryption key is used to decrypt the encrypted authentication data. The user secret is extracted from the biometric sample. The user is authenticated by matching the extracted user secret with the stored user secret.

20 Claims, 6 Drawing Sheets

(56) References Cited

OTHER PUBLICATIONS

International Telecommunication Union, Information technology—Open Systems Interconnection—The Directory: Public-key and attribute certificate frameworks, Series X: Data Networks, Open System Communications and Security, Recommendation ITU-T X.509, Oct. 2012, 208 pages.

International Telecommunication Union, Password-authenticated key exchange (PAK) protocol, Series X: Data Networks, Open System Communications and Security, ITU-T Recommendation X.1035, Feb. 2007, 12 pages.

* cited by examiner

Ordered gesture descriptions.

| Gesture identifier | Annotation | Palm movement | Fingertip movement | Dynamic fingertips |
|---|---|---|---|---|
| 1 | 'CCW' | Static | Circular(CCW) | All |
| 2 | 'CW' | Static | Circular(CW) | All |
| 3 | 'Pinch' | Static | Close | All |
| 4 | 'Drag' | Dynamic(↓) | Parallel | All |
| 5 | 'FPO' | Static | Open | Fixed pinky |
| 6 | 'FTCW' | Static | Circular(CW) | Fixed thumb |
| 7 | 'FTP' | Static | Parallel(↓) | Fixed thumb |
| 8 | 'Opened' | Static | Open | All |
| 9 | 'Swipe' | Dynamic(→) | Parallel | All |
| 10 | 'User-defined' | Dynamic | Parallel | All |

FIG. 6

BIOMETRIC KNOWLEDGE EXTRACTION FOR MUTUAL AND MULTI-FACTOR AUTHENTICATION AND KEY EXCHANGE

BACKGROUND

Access control systems may use one or more authentication factors to verify an individual's identity. For example, authentication factors may include "something-you-know," "something-you-have," and "something-you-are." Some access control systems may require elements from two or three of these categories to provide two or three-factor authentication.

Biometrics may provide the "something-you-are" factor used for identification and authentication. Biometrics can be coupled with other categories of factors, such as "something-you-have," and "something-you-know," to achieve two and three-factor authentication when greater assurance is required than a single factor can provide. Biometric traits may include, for example, biological (e.g., fingerprint, iris, hand geometry, etc.) and behavioral (e.g., gait, gesture, keystroke dynamics, etc.) characteristics that reliably distinguish one person from another.

SUMMARY

Various embodiments relate to a method performed by a processor of a computing system. An example method includes receiving a user identifier and encrypted authentication data from a user. The encrypted authentication data includes a biometric sample encrypted using an encryption key that is generated using a previously established a user secret. The user identifier is matched with a stored user secret. The stored user secret is used to generate a decryption key. The decryption key is used to decrypt the encrypted authentication data. The user secret is extracted from the biometric sample. The user is authenticated by matching the extracted user secret with the stored user secret.

Various other embodiments relate to a computing system. An example computing system includes a network interface in operative communication with a network. The system also includes a database of a plurality of user identifiers and associated stored user secrets. The system further includes a server system, including a processor and instructions stored in a non-transitory machine-readable media. The instructions are configured to cause the server system to receive a user identifier and encrypted authentication data from a user. The authentication data includes a biometric sample encrypted using an encryption key. The encryption key was generated using a previously established user secret. The user identifier is associated with a stored user secret in the database. The retrieved stored user secret is used to generate a decryption key. The decryption key is used to decrypt the encrypted authentication data. A user secret is extracted from the biometric sample. The user is authenticated by matching the extracted user secret with the stored user secret.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF FIGURES

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 6 is an illustration of a two-factor finger movement biometric authentication combining something-you-know and something-you-are, according to an example embodiment.

Figure 1:
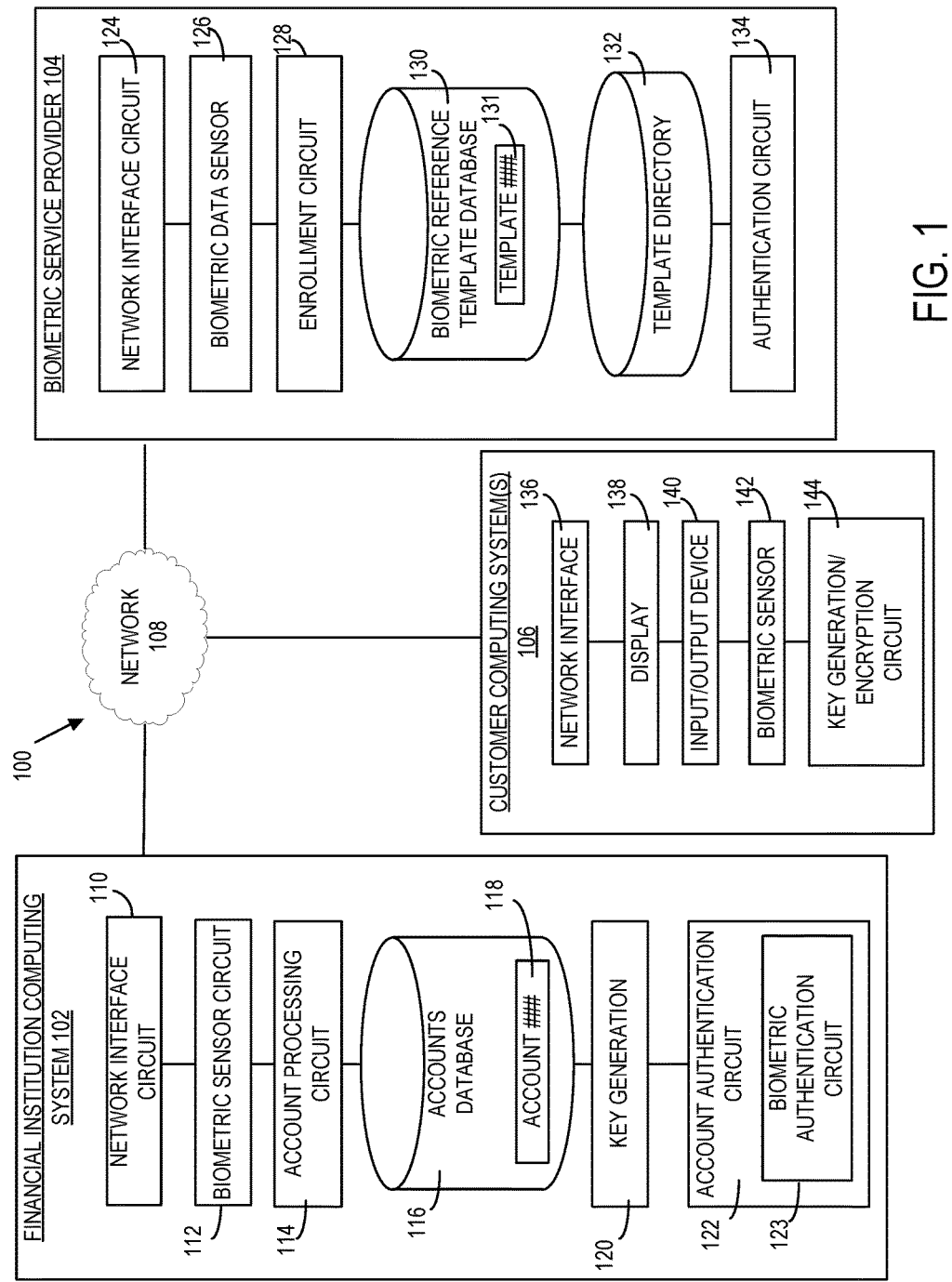
FIG. 1 is schematic diagram of an authentication system, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Authentication factors for access control systems may include "something-you-know," "something-you-have," and "something-you-are" factors. Access control systems typically collect values for each authentication factor category separately, perhaps relying on a token reader, a keyboard, and a biometric sensor for three-factor authentication. However, binary data collected from biometric sensors contains rich information content not limited to only the physiological and behavioral characteristics needed to support biometric matching.

Sensor-collected data can contain human knowledge, which may provide the something-you-know information used for authentication. Knowledge extraction techniques applied to this data can reveal weak secrets expressed by an individual. These secrets are termed weak because they are something a person can easily memorize, such as a passphrase, a password, or a personal identification number ("PIN"). Biometric-based weak secrets may extend these traditional secrets to also include a sequence of footsteps or the finger positions and hand postures used in a gesture (e.g., during communication of hand sign languages).

A password is a something-you-know authenticator, which may include a string of characters that have an equivalent representation shared by communicating parties. This equivalency makes passwords useful as weak secrets in cryptographic key-agreement schemes, which require both parties to know exactly the same secret in order to establish a shared key to ensure secure communications. Though knowledge extracted from biometric sensors can have this useful equivalency attribute of passwords, often it does not.

Server authentication mechanisms, such as the widely deployed Transport Layer Security ("TLS") protocol, rely on strong asymmetric cryptography supported by a resource intensive Public Key Infrastructure ("PKI"). However, achieving mutual authentication using TLS is not so common. It is more likely for client authentication to rely on user passwords, since most users lack the personal digital certificates needed to leverage the mutual authentication option of TLS.

Passwords and other shareable knowledge-based authentication values are typically used for client-side authentication only, with TLS serving to authenticate the server and protect client passwords in transit. Failures in TLS server authentication and user errors have led to widespread phishing by attackers impersonating legitimate servers to capture user credentials. Consequently, there is a need to provide a strong cryptographic protocol that overcomes the shortcomings of TLS.

Referring generally to the figure, embodiments described herein relate generally to systems and methods for mutual and multi-factor authentication via a biometrics-based protocol for authenticated key exchange ("B-AKE"). Generally, B-AKE may be utilized to authenticate a user (e.g. an account holder at a financial institution) to facilitate secure, encrypted communication with the financial institution by extracting knowledge data from a biometric sample provided by a user to perform multi-level authentication.

B-AKE provides communicating parties assurance they know each other (e.g., mutual authentication) and aids in establishing a shared secret—a symmetric cryptographic key—for secure communications known only to them. B-AKE accomplishes user authentication implicitly through establishing an authenticated session key. B-AKE utilizes a combined biometrics password through a version of the Authenticated Key Exchange ("AKE") protocol to provide a strong, faster alternative to TLS. According to various embodiments, B-AKE may be used to authenticate a user (e.g. an account holder at a financial institution) to facilitate secure, encrypted communication with the financial institution.

According to an embodiment, a user provides a biometric sample for authentication. The biometric sample contains, and is parsed into, secret knowledge data, such as a something-you-know weak secret (e.g., a password), and biometric matching data, such as a something-you-are strong secret (e.g., a voice profile, fingerprint, etc.). A symmetric key is created using the extracted secret knowledge data (e.g., using a Password Authenticated Key Exchange Protocol). The symmetric key is used to encrypt the biometric matching data. Some embodiments utilize a key agreement scheme, such as Diffie-Hellman ("D-H"), to create the symmetric encryption key. This key protects the confidentiality of user credentials and other message data transferred during operation of the B-AKE protocol. The encrypted biometric matching data and a user identifier associated with the user are then transmitted to an authentication system. The authentication system may match the user identifier to a stored user secret and generate a decryption key based on the stored user secret. The decryption key may be used to decrypt the encrypted biometric matching data. The secret knowledge data may be extracted from the biometric matching factor and used to authenticate the user with the single authentication factor. The biometric matching data may also be matched with a biometric reference template (e.g., a biometric reference value that is matched against a sample) associated with the user to authenticate the user. The biometric match data recovered from the encrypted message provides a second something-you-are authentication factor.

The B-AKE protocol ensures users never reveal their knowledge or biometric credentials to imposter recipients or man-in-the-middle observers. D-H key agreement allows two parties to establish a cryptographic key without ever actually exchanging the private value. The D-H key establishment provides forward secrecy, a highly desirable protocol property, when participants choose fresh random values each time they operate the protocol, therefore, if a compromise of the long-term keys occurs, it does not compromise the session keys established in previous protocols run involving those principals.

According to various embodiments, an authenticator constructed from knowledge mined from biometric sensor data is used in D-H based AKE protocols. The authenticator may serve in place of a password string. However, according to various embodiments, participants in the exchange represent the knowledge information in a consistent and unambiguous format, such as a canonical encoding based on Abstract Syntax Notation One ("ASN.1"). Doing so allows protocol participants to share precisely the same secret knowledge (e.g. user password, user secret) required to operate the protocol.

B-AKE provides technical solutions to computer-centric and internet-centric problems associated with conventional biometrics and authentication systems. For example, B-AKE, according to various embodiments, provides a more efficient and effective authentication mechanism by providing a multi-factor and mutual authentication from a biometrics-based protocol in place of TLS. The B-AKE protocol is biometrics independent, allowing multiple biometric types to be used to facilitate the mutual authentication. The B-AKE protocol ensures that communicating parties never reveal their knowledge or biometric credentials to imposter recipients or man-in-the-middle observers. Additionally, the B-AKE protocol overcomes the TLS limitation of mutual authentication procedures being dependent on personal digital certificates, by leveraging a user password in the B-AKE protocol and providing for a strong, lightweight alternative to TLS. By using cryptography that does not require the support of a PKI, B-AKE provides mutual authentication while avoiding the TLS server-specific authentication errors and user errors that have resulted in data breaches and phishing attacks. These problems arise out of the use of computers and the Internet, because biometric processing and key exchanges cannot exist without the use of computers and the Internet. Accordingly, problems relating to authentication between communicating parties arise out of computers and the Internet.

Further, the methods and systems described herein alleviate the strain on processing power and memory currently required to achieve multi-factor and mutual authentication. Additionally, the embodiments herein utilize a strong key exchange mechanism that utilizes a symmetric encryption and decryption method that may be 100-10,000 times faster than authentication protocols using asymmetric encryption algorithms, while maintaining the same, or greater, protection of the underlying passcode information in the authentication data exchange between the communicating parties. For example, the key exchange mechanism gives protection against objectively weak password strings by relying on knowledge shared by the communicating parties and providing for multi-factor authentication. The key establishment method provides for the highly desirable protocol property of forward secrecy, wherein participants choose fresh values each time they operate the protocol, without expending processing power typically used for protocols that use fresh values each time.

FIG. 1 is schematic diagram of a B-AKE authentication system for achieving strong, multi-factor, and mutual authentication, according to an example embodiment. The B-AKE 100 includes a financial institution computing system 102, a biometric service provider 104, and one or more customer computing systems 106. Each of the financial institution computing system 102, the biometric service provider 104, and the customer computing systems 106 is in operative communication with the others over a network 108. The network 108 may include, for example, the Internet, cellular networks, proprietary banking networks, and the like. The customer computing system 106 provides a biometric sample containing two types of secrets, to the financial institution computing system 102 under the B-AKE protocol. The financial institution computing system 102 transmits the sample to the biometric service provider 104 to obtain a processed, useable biometric sample. If the received sample of the weak password matches the information in the financial institution for the submitting customer, mutual authentication occurs.

Generally, customers may use the B-AKE system 100 to extract knowledge from a biometric sensor and provide varying levels of authentication data to a financial institution. The system allows for a biometric-based protocol for AKE to be used wherein the system relies on a knowledge factor shared by the communicating parties that is extracted from data collected by biometric sensors. B-AKE uses similar processing as international standards, but allows the use of more general, pre-shared something-you-know biometric knowledge in both client-side and server-side authentication. For example, B-AKE is not restricted to the use of password character strings for the value of the "PW" field in the key exchange processing defined in the ITU-T X.1035 standard. In the B-AKE protocol, type PW is an "open type" and can contain a value of any ASN.1 type in its encoded form. The type of an encoded value can be simple or structured. However, for processing purposes in a B-AKE (or underlying -AKE) protocol, an encoded value of type PW is an opaque string, a series of octets that are independent of hardware, operating system, or programming language considerations. This serialized format is ideal for information exchange between communicating parties that have different computing environment. Unlike passwords, biometric matching data is not a shareable authenticator, since biometric reference data and biometric matching data are not equivalent. As described previously, the user must first enroll their biometric data to create a reference template used later for authentication against the users provided biometric matching data. Analogous to the mutual authentication option of TLS, but without the overhead of a PKI, the B-AKE system 100 ensures mutual authentication of both parties in the act of establishing a symmetric cryptographic key via a commutative cryptographic key exchange.

The financial institution computing system 102 includes a network interface 110, a biometric sensor circuit 112, an account processing circuit 114, an accounts database 116, a key generation circuit 120, and an accounts authentication circuit 122. The network interface 110 is structured to facilitate operative communication between the financial institution computing system 102 and other systems and devices over the network 108. Before utilizing the B-AKE system 100, the financial institution and customer must exchange a password. This password exchange can occur over the network 108 or performed out-of-channel (e.g., at a branch of the financial institution).

The biometric sensor circuit 112 is structured to read a fingerprint, voice profile, or other biometric marker. For some biometric technology types, a contrived context for biometric matching can provide the opportunity for collecting additional knowledge information from biometric sensor data. From an access control perspective, the context can be used to provide an additional authentication factor, which can be considered another layer of defense. The biometric technology captures the something-you-are biometrics matching data using a context useful for collecting the something-you-know information needed to operate a B-AKE protocol. In some embodiments, the financial institution computing system 102 is tasked with generating the initial biometric reference template for the customer via the biometric sensor circuit 112.

The account processing circuit 114 is structured to receive the user identifier and cross-reference it with the accounts database 116 to locate the specific user account 118 and the stored information for that account. For example, upon receiving the user identifier of "John Smith," (e.g., John Smith's username, email address, customer number, Social Security Number, driver's license number, etc.), the account processing circuit 114 will look for John Smith's account in the account database 116 and retrieve the biometric reference template and shared secret from the located account 118. In some embodiments, the account processing circuit 114 will retrieve this account in the accounts database 116 and retrieve the biometric reference template and shared secret from the located account 118. In other embodiments, the account authentication circuit 122 is in control of the account processing circuit 114. In some arrangements, the account processing circuit 114 will deny authorization if there is no matching user identifier in the accounts database 116 or if the user identifier does not have the biometric reference template for the type of biometric sample. In other embodiments, the biometric reference template is only stored on the biometric service provider's system 104. In some embodiments, the account processing circuit 114 assigns a possession object identifier to uniquely identify an object or device associated with the customer. The possession object identifier may be used to provide a something-you-have factor associated with the user identifier. Generally, the object identifier is associated with the customer (e.g., with the customer's user identifier) during the authentication process. A customer could have multiple possession object identifiers associated with the user identifier. The possession object identifier may comprise a value that uniquely identifies the object. For example, the possession object identifier may comprise an IP address, a MAC address, an RFID tag address, etc., of the object. The object may include, for example, a smartphone, a computing device, a biometric sensor, a key fob, an IoT device, and the like.

The accounts database 116 includes a plurality of information for account holders who are to be authenticated. The accounts database 116 links a user identifier to a biometric reference template for each of the user accounts 118, which are generated when customers enroll in the biometric service. The user identifier can be, for example, a username, email address, customer number, Social Security Number, driver's license number, phone number, etc. The user secret, which is the shared knowledge between the two parties, is also stored in the accounts database 116 and can be used for authentication.

The key generation circuit 120 is structured to derive a cryptographic key using an agreed-upon encryption algorithm (e.g., encryption protocol), for example, the D-H protocol, other commutative encryption algorithms, etc. The key generation circuit 120 derives a cryptographic key based on the user secret. Both parties must have pre-established the protocol operation, as well as share knowledge of the password both parties will use with the commutative encryption algorithm protocol to generate similar keys. The generated key will be used to encrypt the initial authentication data message and, if authenticated, future communications between the parties. By using a D-H key exchange, the B-AKE protocol ensures perfect forward secrecy, which guarantees that a compromise of a session key or long-term private key after a given session will not cause the compromise of any earlier session.

The account authentication circuit 122 is structured to determine whether to authenticate the two parties, specifically if the user submitting the user identifier and the encrypted message matches the customer information on file. The account authentication circuit 122 uses the information retrieved by the account processing circuit 114 from the account database 116 to authenticate the requesting party. The account authentication circuit 122 uses the key generated from the key generation circuit 120 to decrypt the encrypted message, thereby extracting a biometric sample. The biometric sample includes a biometric message, the something-you-know factor; and biometric characteristics, the something-you-are factor. In some embodiments, the biometric sample may include a biometric access phrase in addition to the user secret, the customer can provide a biometric access phrase of "I use my voice to log on now brown cow" which provides a biometric sample that includes a biometric access phrase ("I use my voice to log on") and a user secret ("now brown cow"). The account authentication circuit may be structured to parse the biometric access phrase and the user secret. In some embodiments, authentication is triggered when the biometric access phrase is detected.

In some embodiments, the decrypted message also includes the something-you-know factor entered in cleartext form (e.g., not extracted from the biometric sample). In some embodiments, the biometric sample is transmitted to the biometric service provider 104 which uses a matching algorithm to compare the biometric reference template stored on the biometric service provider's server 104 to the biometric sample. The biometric service provider 104 returns, over the network 108, the something-you-know knowledge factor that is stored in the biometric sample. In some arrangements, the biometric service provider 104 returns a positive or negative biometric reference template-sample match data value to the biometric authentication circuit 123 responsive to the biometric sample matching the biometric reference template on file for that user. In other embodiments, the biometric authentication circuit 123 compares the biometric sample to the biometric reference template retrieved from the accounts database 116 for the provided user identifier corresponding to the user account 118. The comparison includes using a biometric processing algorithm or a biometric matching algorithm.

If the something-you-know knowledge factor extracted from the sample matches the information stored in the accounts database 116, then the biometric authentication circuit 123 provides a positive authentication value to the account authentication circuit 122 which in turn authenticates the customer. In some embodiments, the biometric reference template-sample match data value provided by the biometric service provider 104 is confirmed as positive to provide another layer of authentication. In some embodiments where the biometric sample includes the cleartext password, the account authentication circuit 122 compares the decrypted message's user password to the stored password. If it matches, and a positive value has been determined from the biometric authentication circuit, then the account authentication circuit 122 provides an authentication to the customer. When the customer is authenticated, the account authentication circuit 122 will use the cryptographic key to encrypt all further communications between the parties for the duration of the session. In some arrangements, the account authentication circuit 122 compares the possession object identifier in the encrypted authentication data with any possession object identifiers associated with the user identifier to confirm the something-you-have. For example, authentication would fail if the provided biometric sample was extracted from a biometric sensor with the physical address "ABC" and the user identifier only enrolled a possession object identifier for biometric samples to be submitted from a biometric sensor with the physical address of "EFG." In some arrangements, the customer has a fob that is the possession object identifier associated with the user identifier. During authentication, the customer provides the fob (e.g., the something-you-have factor) with the biometric sample that includes a biometric message (e.g., the something-you-know factor) and biometric characteristics (e.g., the something-you-are factor).

The biometric service provider system 104 includes a network interface 124, a biometric data sensor 126, an enrollment circuit 128, a biometric reference template database 130, a template directory 132, and an authentication circuit 134. The network interface 124 is structured to facilitate operative communication between the biometric service provider 104 and other systems and devices over the network 108. In some embodiments, the biometric service provider 104 is the financial institution.

The biometric data sensor 126 is structured to capture a biometric sample, such as a fingerprint, voice profile, or other biometric marker. The biometric data sensor receives the biometric data sample(s) from the customer in order to generate the biometric reference template to be used for authentication. In some embodiments, different biometric technology types provide the opportunity to collect additional knowledge information from biometric sensor data. From an access control perspective, the context can be used to provide an additional authentication factor, which can be considered another layer of defense. Together, the biometric technology captures the something-you-are biometrics matching data via a context useful for collecting the something-you-know information needed to operate a B-AKE protocol. In some embodiments, the customer must provide their biometric sample(s) to the biometric service provider 104 before they can be authenticated and granted access to the financial institution computing system 102. In some embodiments, the biometric sample may only be transmitted by an employee of the biometric service provider entering the data into a computing system (e.g., an employee terminal connected to the server of the biometric service provider) during a person-to-person interaction. For example, the customer may walk into a branch location of the biometric service provider and initiate the enrollment processor via interaction with a teller at the provider.

The enrollment circuit 128 is structured to receive a plurality of biometric samples and convert them into data that can be compared to and stored in a biometric reference template. The biometric reference template database 130 is a plurality of user identifiers and corresponding biometric reference templates, which are a byproduct of the customer enrolling in the biometric service. The user identifier can be, for example, a user name, email address, phone number, or the actual name of the customer. The template directory 132 is structured to receive a biometric sample and a corresponding user identifier from the financial institution computing system 102 over the network 108. The template directory 132 finds the corresponding biometric reference template(s) 131 for the user identifier in the biometric reference template database 130 and transmits them to the authentication circuit 134. In some arrangements, the enrollment circuit 128 receives possession object identifiers to be associated with the user identifier. In order to be authenticated, the customer associated with the user identifier would have to possess the object identifier when providing the biometric sample. The possession object identifiers, being the something-you-have factor, could be a key fob, a MAC address for a computing device, a coordinate location pairing, etc.

The authentication circuit 134 is structured to compare a biometric sample received from the financial institution computing system 102 to the biometric sample for the corresponding user identifier. The authentication circuit 134 compares the biometric sample to the biometric reference template 131 retrieved from the biometric reference template database 130 for the provided user identifier. The comparison can include using a biometric processing algorithm or a biometric matching algorithm. If the sample matches the reference template, the authentication circuit 134 provides a positive authentication value to the biometric authentication circuit. In some embodiments, the biometric message is parsed from the biometric sample and used by the financial institution computing system 102 to compare it to the user secret in the account database 116, thereby providing an additional layer of authentication. In some arrangements, the authentication circuit 134 will provide a negative matching value if there is no matching user identifier in the biometric reference templates database 130 or if the user identifier does not have a biometric reference template for the biometric type of the biometric sample. In some embodiments, the authentication circuit 134 matches the possession object identifier with the biometric sample to a stored possession object identifier associated with the user identifier.

The customer computing systems 106 include a network interface 136, a display 138, an input/output device 140, a biometric sensor 142, and a key generation/encryption circuit 144. The network interface 136 is structured to facilitate operative communication between customer computing systems 106 and other systems and devices over the network 108. The customer computing systems 106 may include smartphones, tablet computing systems, laptop computing systems, desktop computing systems, PDAs, smart watches, smart glasses, tablets, etc.

The display 138 is structured to present authentication instructions and information and, if authenticated, account information, transaction information, and the like, to customers. The input/output device 140 is structured to receive input from the customer via the customer computing systems 106. The input/output device 140 may allow a user to provide a user identifier, a secret knowledge factor, etc. Additionally, the input/output device 140 may allow a customer to select a biometric type from a list of possible biometric authenticators. For example, the customer can select to provide a fingerprint, voice, or video biometric sample. The input/output device 140 may include a keyboard, a mouse, a touchscreen, a biometric sensor (e.g., a fingerprint sensor), a microphone, a camera, etc. In some embodiments, the input/output device is the same as the biometric sensor 142.

The biometric sensor 142 is structured to read a fingerprint, voice print, or other biometric marker. Generally, the biometric sensor is any device or combination of devices that support the capture of biometric something-you-are matching data using a context useful for collecting something-you-know information needed to operate a B-AKE protocol. In one embodiment, the biometric sensor is connected to a floor pad operably connected to the customer computing system 106 by collecting both the walking and stepping patterns from the walking samples for biometric matching using a two-dimensional biometric sensor grid. The order and identities of tiles encountered as participants traverse the grid could convey user knowledge through a stepping pattern. A series of identifiers mapped to user-selected tiles forming a memorized stepping pattern could serve as the customer's something-you-know in the B-AKE protocol.

The key generation/encryption circuit 144 is structured to derive a cryptographic key using an agreed-upon commutative encryption algorithm and encrypt the authentication message with the generated key. The commutative encryption algorithm can be, for example, the D-H protocol. The key generation/encryption circuit 120 derives a cryptographic key based on the shared user secret. As discussed previously, both parties must have pre-established shared secret that will be used by both parties to generate the same keys. The generated key may be used to encrypt the initial authentication message and, if authenticated, future communications between the parties.

The key generation/encryption circuit 144 uses the generated key to encrypt the biometric sample taken from the biometric sensor 142. The biometric sample includes a biometric message (e.g., the something-you-know factor) and biometric characteristics (e.g., the something-you-are factor). In some embodiments, the encrypted message also includes the user secret, encrypted by the key. The encrypted message is then sent along with the user identifier to the authenticating party on the financial institution computing system 102. In some arrangements, the encrypted message is then sent along with the user identifier to the authenticating party on a proxy of the financial institution computing system 102.

Figure 2:
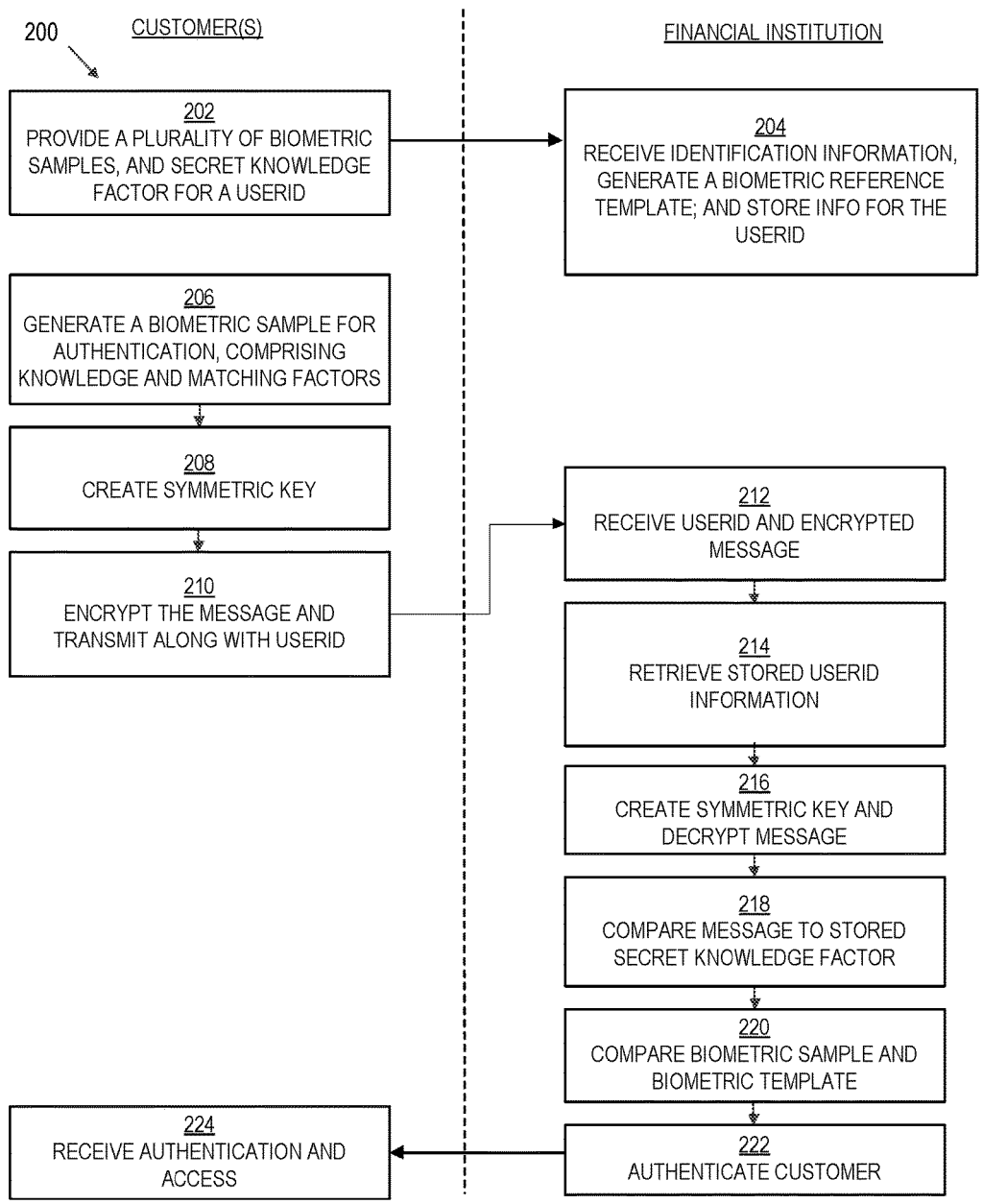
FIG. 2 is flow diagram of a method of authenticating a customer and a financial institution, according to an example embodiment.

FIG. 2 is a flow diagram of a method 200 of authenticating a customer and a financial institution, according to an example embodiment. For example the customer may be an individual who operates the customer computing system 106 of FIG. 1. The financial institution may be a financial institution that manages the financial institution computing system 102 of FIG. 1. However, the method 200 may be similarly performed by other systems and devices.

At 202, the customer provides a plurality of biometric samples, and creates a secret knowledge factor, which are associated with the customer's user identifier. In some embodiments, the initial biometric sample is taken at the financial institution using a biometric sensor. In other embodiments, the customer must go to a biometric service provider 104 and have their plurality of initial biometric samples taken at an establishment managed by the biometric service provider 104. However, in other embodiments, the initial biometric sample is taken on the customer's computing system, for example on a mobile device. The biometric sample may be, for example, a finger print, a retina scan, a voice profile, etc. The secret knowledge factor is a something-you-know factor, for example a password string of "password 123."

At 204, the financial institution receives the biometric sample and secret knowledge factor corresponding to the customer's user identifier. In some embodiments, the biometric sample is converted into a biometric reference template by the financial institution computing system 102. However, in other embodiments, the biometric sample may be transmitted to a biometric service provider 104 that will generate and return a biometric reference template to the financial institution. In some embodiments, the secret knowledge factor may be transmitted only by having an employee of the financial institution enter the data into a computing system (e.g., an employee terminal connected to the server of the financial institution) during a person-to-person interaction. For example, the customer walks into a branch location of the financial institution and initiates the authentication request via interaction with a teller at the branch. In other embodiments, the secret knowledge is shared using an encrypted, secure connection via the network 108. The biometric reference template and the secret knowledge factor are stored with the user identifier for future authentication instances.

At 206, the customer begins the authentication process by generating a biometric sample that includes knowledge and matching factors. The secret knowledge factor is provided within the biometric sample. For example, the customer's biometric sample could include a biometric access phrase of "my password is password 123;" the knowledge factor would be the extracted "password 123," which matches the customer's secret knowledge factor and the matching factors would be the voice profile that matches the voice profile in the customer's biometric template.

At 208, a symmetric key is created using an agreed upon encryption algorithm. Using the protocol, a cryptographic key is derived using the secret knowledge factor. The generated cryptographic key is used to encrypt the message to be transmitted. If the user is authenticated, the generated cryptographic key may be used to encrypt future communications between the parties.

At 210, the message is encrypted using the symmetric key and the encrypted message is transmitted with the user identifier. In some arrangements, the encrypted message includes the biometric sample as well as a cleartext of the secret knowledge factor to provide multi-factor authentication. For example, the customer could provide the biometric sample and also type in the secret knowledge factor to the same device and both may be encrypted by the symmetric key.

At 212, the financial institution receives the encrypted message and the user identifier. In some embodiments, the message may only be transmitted by an employee of the financial institution extracting the data at a financial institution computing system (e.g., an employee terminal connected to the server of the financial institution) during a person-to-person interaction. For example, the customer may walk into a branch location of the financial institution and initiate the authentication request via interaction with a teller at the branch. However, in other embodiments, the encrypted message can be transmitted by any computing system. For example, the customer may log onto a webpage for the financial institution using a laptop and provide a voice biometric sample using a built in microphone and type out the user secret and user identifier within fields on the webpage.

At 214, the financial institution uses the user identifier to retrieve the stored biometric reference template and the secret knowledge factor for the customer. In some embodiments, after receiving the message, at 212, the financial institution determines if the requesting customer is registered with the financial institution and has a biometric reference template on file. If the requestor is not registered, the financial institution may deny the authentication request or require the requestor to provide a different user identifier for the encrypted message.

At 216, the financial institution uses the stored secret knowledge factor to generate a symmetric key using the agreed-upon commutative encryption algorithm. Using the protocol and the user secret, a cryptographic key is derived. The generated key is used to decrypt the message via the same encryption algorithm that was used by the customer to encrypt the message.

At 218, the financial institution compares the stored secret knowledge factor to the message secret knowledge factor. In some embodiments, if the secret knowledge factors do not match, the financial institution will deny the authentication request and may allow the requestor to resubmit the secret knowledge factor without having to redo the biometric sample. In other embodiments, the financial institution may defer denying the authentication request pending the comparison of the decrypted biometric sample and the biometric reference template.

At 220, the financial institution compares the decrypted biometric sample and the biometric reference template. The comparison uses a biometric processing algorithm or a biometric matching algorithm. If the sample matches the reference template, then a positive authentication value is reached. In some embodiments, the biometric message is parsed from the biometric sample and compared to the stored secret knowledge factor in the financial institution database in order to provide another layer of authentication. In some embodiments, the financial institution will require that the decrypted message's user secret is the same as the stored user secret 218, providing authentication to the user if both match. In some embodiments, the financial institution sends the biometric sample to a biometric service provider 104 to compare the sample and the reference template. In some embodiments, if the sample and reference template to not match, the financial institution may deny authentication. In other embodiments, the financial institution may grant authentication if the secret knowledge factors match at 218. In some embodiments, the financial institution also matches a possession object identifier included with the biometric sample to a stored possession object identifier associated with the customer's user identifier.

At 222, the financial institution authenticates the customer. In some embodiments, the symmetric key is used to encrypt all communications from the financial institution to the customer for the duration of the session. At 224, the customer receives authentication from the financial institution and access to request further information. In some embodiments, the symmetric key is used to encrypt all communications from the customer to the financial institution for the duration of the session.

Figure 3:
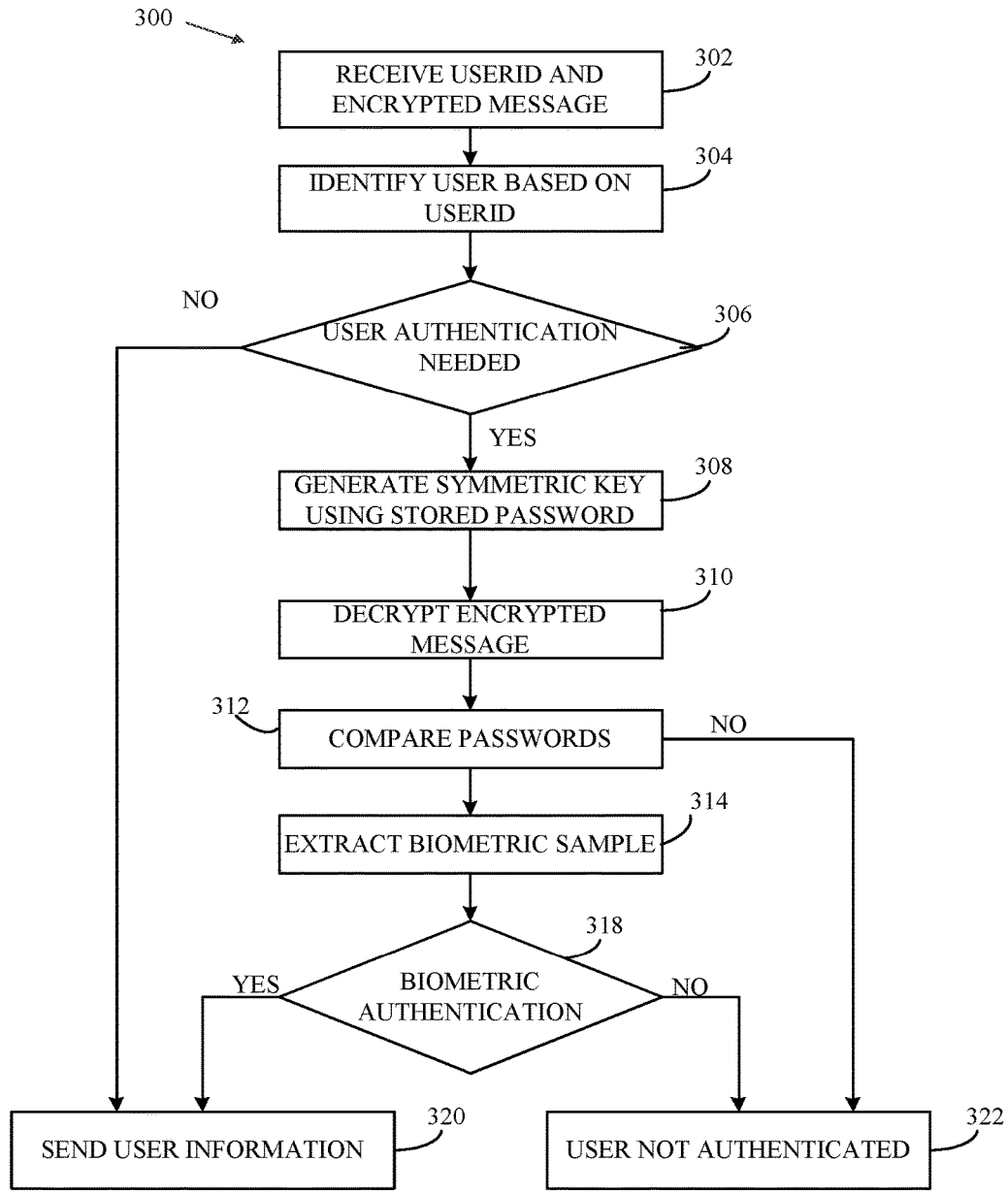
FIG. 3 is a flow diagram of a method of authenticating a user, according to an example embodiment.

Referring to FIG. 3, a method 300 of authenticating a requestor is shown, according to an embodiment. The method 300 may be performed in connection with the method 200 of FIG. 2. However, the method 300 may similarly be performed in connection with other types of transactions or services. The method 300 is shown in connection with an authenticator and a requestor. For example, the authenticator may be a financial institution that manages the financial institution computing system 102 of FIG. 1. The requestor may be an entity that manages the customer computing systems 106 of FIG. 1. However, the method 300 may be similarly performed by other systems and devices.

The method 300 begins when an authenticator receives a user identifier and an encrypted message at 302. The authenticator uses the user identifier to determine if the claimed identity of the message sender is one that requires authentication and is in the database at 304. At 306, if no user authentication is needed, the requested information is sent to the user, at 320, for example in a situation where the user is requesting access to the authenticator's public rules of conduct. If further authentication is required, at 308, the authenticator generates a symmetric key using the stored password/shared secret, for the user identifier on file. The key is generated using an agreed upon commutative encryption algorithm, for example, the D-H protocol, based on the user secret.

The generated cryptographic key is then used to decrypt the message at 310. The decrypted message may have a plurality of possession object identifiers for each piece of information stored in the message. In this particular embodiment, the message contains the user password and a biometric sample. At 312, the decrypted user password is compared to the stored user password. If they match, then the user is further authenticated at 314. If they do not match, then at 322, the user is not authenticated.

If the passwords match, the biometric sample is extracted from the message at 314. In some embodiments, the biometric sample includes a biometric message (e.g., the something-you-know factor) and biometric characteristics (e.g., the something-you-are factor). In some embodiments, the biometric message is the equivalent of the user password. The authenticator then compares the biometric sample to a biometric reference template for the user identifier stored in the authenticators database at 319. If the sample matches the reference template, the user is authenticated and is sent any subsequently requested information at 320. If the sample and the reference template do not match, at 322, the user is not authenticated. In some arrangements, the authenticator matches a possession object identifier included with the biometric sample to a stored possession object identifier associated with the customer's user identifier.

Figure 4:
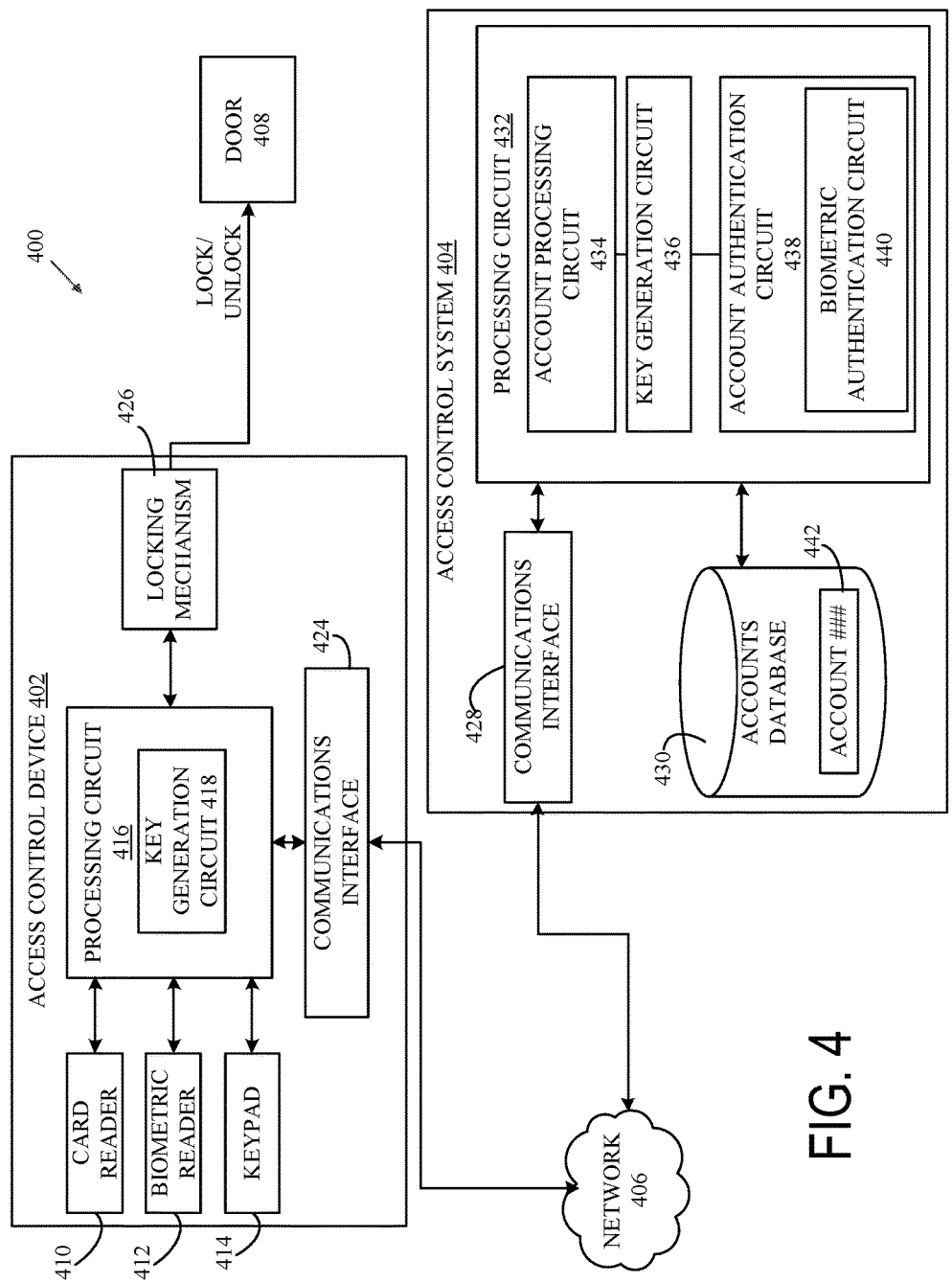
FIG. 4 is a block diagram illustrating an access control device for a biometric authentication system, according to an example embodiment.

Referring now to FIG. 4, a block diagram illustrating a biometric authentication system 400 is shown, according to an example embodiment. The system 400 includes an access control device 402 connected to an access control system 404 over a network 406. The access control device 402 is structured to provide access to a physical or electronic (e.g., virtual) device. For example, as illustrated in FIG. 4, the access control device 402 is connected to and controls the unlocking/locking of a door 408.

The access control device includes a plurality of input devices 410, 412, 414, a processing circuit 416, a communication interface 424, and a locking mechanism 426. The plurality of input devices includes a card reader 410 (e.g., an IC card reader), a biometric reader 412, and a keypad 414. The access control device 402 may use the input devices to receive input from a user or from a security device possessed by the user. For example, the card reader 410 may be configured to read a smartcard possessed by a user and automatically obtain a card ID from the smart card. Using either the card reader 410 or the keypad 414, the user can input their user identification to provide the access control system 404 with the detail necessary to retrieve the stored user secret. The biometric sensor 412 may be structured to read a fingerprint, voice print, or other biometric marker. The keypad 414 may be configured to receive an access code or other security credential from a user. In some embodiments, the biometric reader 412 is integrated into the keypad to allow a biometric finger print and gesture marker to be extracted.

The communication interface 424 is structured to provide communications with the access control system 404 over the network 406. The communications interface 424 may include wired or wireless interfaces (e.g., jacks, antennas, transmitters, receivers, transceivers, wire terminals, etc.) for conducting data communications with various systems, devices, or networks. For example, the communications interface 424 can include an Ethernet card and port for sending and receiving data via an Ethernet-based communications network. As another example, the communications interface 424 may include a WiFi transceiver for communicating via a wireless communications network. The communications interface 424 may be structured to communicate via local area networks (e.g., a building LAN), wide area networks (e.g., the Internet, a cellular network, etc.), and/or direct communications (e.g., NFC, Bluetooth, etc.). In various embodiments, the communications interface 424 may be configured to conduct wired and/or wireless communications. For example, the communications interface 424 may include one or more wireless transceivers (e.g., a WiFi transceiver, a Bluetooth transceiver, a NFC transceiver, a cellular transceiver, etc.) for communicating with mobile devices.

The processing circuit 416 includes a key generation circuit 418 and is structured to generate a key and encrypt the authentication message. Using the agreed-upon D-H protocol, the key generation circuit 418 derives a cryptographic key based on the password. Both parties must have pre-established the protocol operation, as well as shared knowledge of a password that both parties will use with the D-H protocol to generate similar keys. The generated key will be used to encrypt the initial authentication and, if authenticated, future communications between the parties. The biometric sample is then encrypted into a message using the key that was derived from the user secret and the previously agreed upon commutative encryption algorithm. In some embodiments, the biometric sample includes a biometric message (e.g., the something-you-know factor) and biometric characteristics (e.g., the something-you-are factor). In some embodiments, the encrypted message also includes the user secret, encrypted by the key. The encrypted message is then sent along with the user identifier to the authenticating party via the communication interface 424.

Still referring to FIG. 4, the access control device 128 is shown to include a locking mechanism 426. The locking mechanism 426 may include an electronic lock, latch, or other mechanism configured to lock, unlock, open, close, or otherwise control access through an access point. In some embodiments, the locking mechanism 426 includes a solenoid, motor, actuator, or other mechanical device configured to physically lock or unlock a door or other access point. In some embodiments, locking mechanism 426 includes a magnetic lock configured to selectively power and de-power an electromagnet that holds a door in a locked position. The access control device 402 may receive access requests via the card reader or other user input devices (e.g., by receiving or reading a security credential from a user or user device). The access control device 402 may process the access requests using the processing circuit 416 and generate access request events. The access request events may include timestamps, access control device IDs, security credentials, user IDs, or any other information describing the access requests. The access control device 402 may send the access request events to the access control system 404 via the network 406. In response to the access control system 404, the access control device 402 may operate the locking mechanism to allow or deny access through the door 408 or other access point. The network 406 may include one or more of the Internet, cellular networks, proprietary banking networks, and the like.

Turning now to the access control system 404 in FIG. 4. The access control system 404 is shown to include a communications interface 438, an accounts database 430, and a processing circuit 430. The communications interface 438 may include wired or wireless interfaces (e.g., jacks, antennas, transmitters, receivers, transceivers, wire terminals, etc.) for conducting data communications with various systems, devices, or networks. For example, the communications interface 438 can include an Ethernet card and port for sending and receiving data via an Ethernet-based communications network. In various embodiments, the communications interface 438 may be configured to conduct wired and/or wireless communications.

The accounts database 430 is plurality of information for an account holder/user who is one of the parties attempting to be authenticated. The database links a user identifier to a biometric reference template, a byproduct of the user enrolling in the biometric service. The user identifier can be, for example, a user name, email address, phone number or actual name of the user. Also stored in the accounts database is the user secret which is the shared knowledge between the two parties that will be used for authentication.

The processing circuit 432 is shown to include an account processing circuit 434, a key generation circuit 436, and an account authentication circuit 438. The account processing circuit 434 is tasked with receiving the user identifier and cross-referencing it with the accounts database 430 to locate the specific user account 442 and the stored information for that account. For example, upon receiving the user identifier of "John Smith," the account processing circuit 434 will look for John Smith's account in the account database 430 and retrieve the biometric reference template and shared secret from the located account 442. Using the agreed upon D-H protocol, the key generation circuit 436 derives a cryptographic key based on the password. Both parties must have pre-established the protocol operation, as well as share knowledge of a password that both parties will use with the D-H protocol to generate similar keys. The generated key will be used to encrypt the initial authentication and, if authenticated, future communications between the parties.

The account authentication circuit 438 is structured to determine whether to authenticate the two parties, specifically whether the user submitting the user identifier and the encrypted message matches the user on file. The account authentication circuit 438 uses the key generated from the key generation circuit 436 to decrypt the encrypted message, extracting a biometric sample. In some embodiments, the biometric sample includes a biometric message (e.g., the something-you-know factor) and biometric characteristics (e.g., the something-you-are factor). In some embodiments, the decrypted message also includes the user secret. The biometric authentication circuit 440 then compares the biometric sample to the biometric reference template in the accounts database 430 for the provided user identifier. The comparison includes using a biometric processing algorithm or a biometric matching algorithm. If the sample matches the reference template, the biometric authentication circuit 440 provides a positive authentication value to the account authentication circuit 438, which in turn authenticates the user. In some embodiments, the biometric message is parsed from the biometric sample and compared to the user secret in the account database 430 to provide another layer of authentication. In some embodiments, the account authentication circuit 438 also checks the decrypted message's user secret to the stored user secret. If it matches, along with a positive value from the biometric authentication circuit, the account authentication circuit 438 will provide a authentication to the user.

Figure 5:
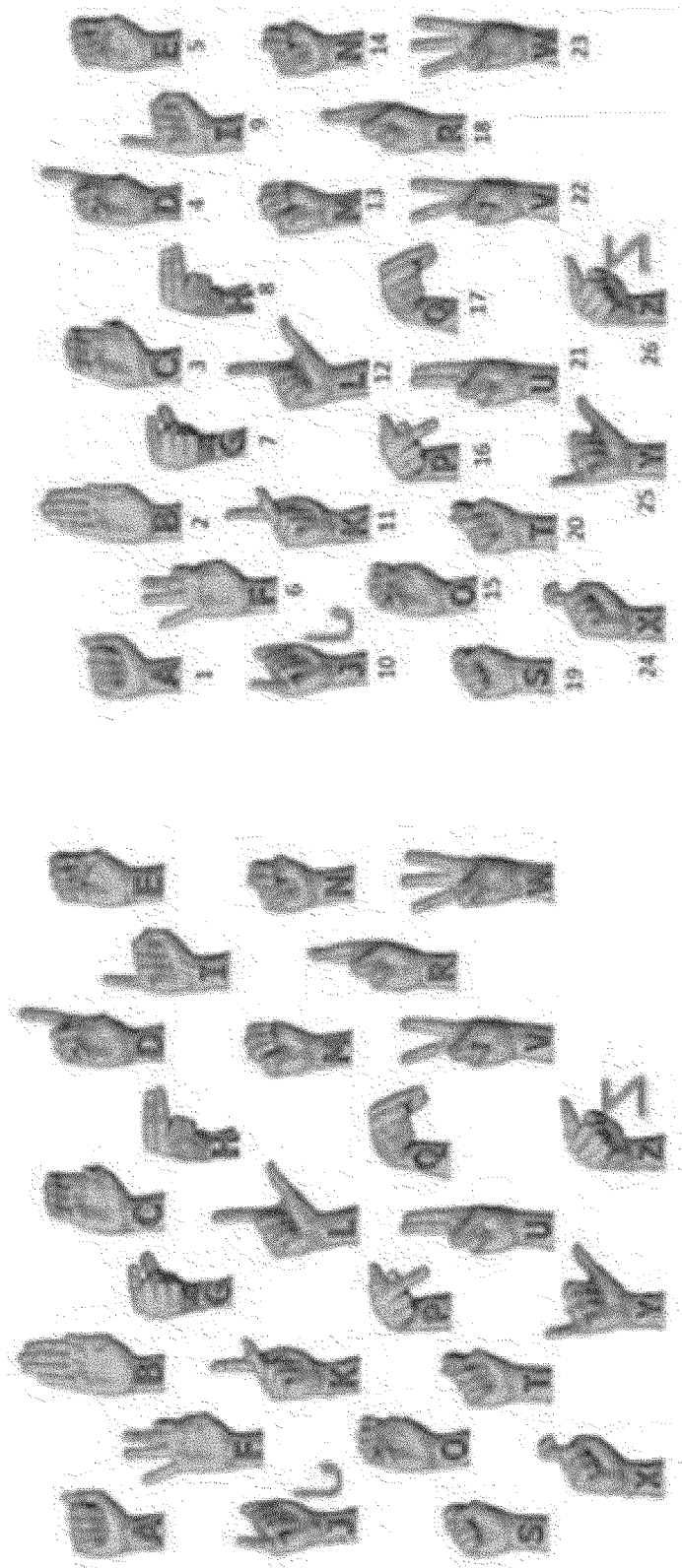
FIG. 5 is an illustration of a two-factor hand-gesture biometric authentication combining something-you-know and something-you-are, according to an example embodiment.

FIG. 5 is an illustration of a two-factor hand-gesture biometric authentication combining something-you-know and something-you-are factors. Gestures can be in the form of a passphrase or password or they can represent movements completely unrelated to any language. Unlike passwords entered using conventional keyboard devices, user knowledge extracted from biometric sensor data requires additional transformation processing before it is suitable for use as an authenticator or as input to a B-AKE protocol. The embodiment uses a sequence of hand signs, such as the those representing the letters "'p', 'a', 's', 's', 'w', 'o', 'r', and 'd'" can be encoded as a series of gesture images and used to authenticate the claimed identity of an individual. The gestures serve as the something-you-know authentication factor and provide context for biometric feature extraction and biometric matching based on the something-you-are authentication factor, analyzing the hand shape and the postures in doing those gestures.

By having each hand sign associated with one character (e.g., a letter of the alphabet), the input of alphabetic and numeric letters and two authentication factors is possible. Further, the extracted knowledge can be put in a form suitable for use in the B-AKE key exchange protocol by assigning each letter in the hand sign alphabet assigned to a number, or having complex hand signs (e.g. a clenched fist) a unique numeric value. For example, the hand signed letters "'p', 'a', 's', 's', 'w', 'o', 'r', and 'd'" may be represented as a sequence of integers, and have the value of an ASN.1 relative object identifier type of "9.12.15.15.22.5.21.14". This value can be unambiguously transferred in an instance of communication in a compact binary format, encoded as the 8-byte hexadecimal value "0D06090C 0F160515" using the Distinguished Encoding Rules ("DER") of ASN.1. Encoded integer values can also represent complex gestures, such as the clinched fist gesture, that are not associated with a signing alphabet.

FIG. 6 is an illustration of a two-factor finger movement biometric authentication that uses multi-touch gestures for user authentication on touch-sensitive devices. Utilizing the rich array of sensors and capabilities found frequently on mobile devices, such as smart phones and tablet computers, variations in hand geometry and muscle behavior can support many authentication methods beyond passwords and PIN codes. FIG. 6 shows a set of canonical gestures that can be identified by creating a gestural taxonomy based on movement of the palm and the fingertips and the number of fingertips involved in the gesture. Their type definitions are in order by numeric gesture identifier and each identifier names a unique palm movement, fingertip movement, and dynamic fingertip value that defines a gesture in the gestural taxonomy table.

While the recognition performance of this embodiment may result in error rates, by assigning the gestures to a series of canonical gestures to work in the B-AKE protocol the error rates can be minimized. For example, a series of canonical gestures "'CCW', 'Pinch', 'Drag', 'Swipe', 'CW', 'User-defined', and 'FTP',", knowledge extracted from biometric sensor data and represented as a sequence of integers can be the value of an ASN.1 relative object identifier type "1.3.4.9.2.10.7". This knowledge value extracted from biometric information can be DER encoded as the 9-byte hexadecimal value "0D070103 04090A07" and used as the PW input to B-AKE. Even when a biometric technology type is too weak for use as an authenticator, knowledge data collected from biometric sensors can achieve strong mutual authentication and create a shared cryptographic key to ensure confidentiality between communicating parties.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied.

The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:
   receiving, by a computing system, a user identifier and encrypted authentication data message from a user, the encrypted authentication data message comprising a biometric sample encrypted using an encryption key, the encryption key generated using a user secret factor within the biometric sample as an input to a password authenticated key exchange protocol;
   matching, by the computing system, the user identifier with a stored user secret;
   generating, by the computing system, a decryption key using the stored user secret as an input to the password authenticated key exchange protocol, the stored user secret retrieved based on the user identifier;
   decrypting, by the computing system, the encrypted authentication data message using the decryption key;
   extracting, by the computing system, the user secret from the biometric sample;
   authenticating, by the computing system, the user by matching the extracted user secret with the stored user secret; and
   authenticating, by the computing system, identity of the user by matching the decrypted biometric sample with a biometric reference template associated with the user identifier,
   wherein a subsequent communication with the user and the computing system is encrypted using the user secret factor,
   wherein the biometric sample includes each of the user secret and a biometric access phrase, and
   wherein extracting the user secret from the biometric sample includes parsing the user secret and the biometric access phrase.

2. The method of claim 1, further comprising:
   receiving, by the computing system, a biometric reference sample from the user;
   generating, by the computing system, a biometric reference template based on biometric characteristics extracted from the biometric reference sample;
   associating, by the computing system, the user identifier with the biometric reference template; and
   storing, by the computing system, the biometric reference template and the associated user identifier.

3. The method of claim 2,
   wherein the biometric reference sample is received during an enrollment procedure, and wherein the enrollment procedure further includes receiving the user secret from the user.

4. The method of claim 3, wherein the user secret received during the enrollment procedure includes a typed password.

5. The method of claim 1,
   wherein the encrypted authentication data message further includes an object identifier, and
   wherein authenticating the user further includes matching the object identifier with a stored object identifier associated with the user identifier.

6. The method of claim 5, wherein the object identifier is associated with a physical object used to capture the biometric sample.

7. The method of claim 1, wherein authenticating the user further comprises:
   transmitting, by the computing system to a biometric service provider computing system, a matching request, the matching request including the user identifier and the biometric sample; and
   receiving, by the computing system from the biometric service provider computing system, a binary match value, the binary match value relating to a comparison of the biometric sample to a provider biometric reference template stored on a database of the biometric service provider computing system.

8. A method, comprising:
   receiving, by a computing system, a user identifier and encrypted authentication data message from a user, the encrypted authentication data message comprising a biometric sample encrypted using an encryption key, the encryption key generated using a user secret factor within the biometric sample as an input to a password authenticated key exchange protocol;
   matching, by the computing system, the user identifier with a stored user secret;
   generating, by the computing system, a decryption key using the stored user secret as an input to the password authenticated key exchange protocol, the stored user secret retrieved based on the user identifier;
   decrypting, by the computing system, the encrypted authentication data message using the decryption key;
   extracting, by the computing system, the user secret from the biometric sample;
   authenticating, by the computing system, the user by matching the extracted user secret with the stored user secret; and
   authenticating, by the computing system, identity of the user by matching the decrypted biometric sample with a biometric reference template associated with the user identifier,
   wherein a subsequent communication with the user and the computing system is encrypted using the user secret factor,
   wherein subsequent communications between the computing system and the user are encrypted using the encryption key generated based on the user secret.

9. The method of claim 1, wherein the encryption key is generated using a commutative encryption algorithm.

10. The method of claim 1, wherein the encryption key is a symmetric encryption key generated using a Diffie-Hellman encryption algorithm.

11. A system comprising:
a network interface structured to facilitate data transmission over a network;
a database of a plurality of user identifiers and associated stored user secrets; and
a server system comprising a processor and instructions stored in non-transitory machine-readable media, the instructions configured to cause the server system to:
receive a user identifier and encrypted authentication data message from a user, the encrypted authentication data message comprising a biometric sample encrypted using an encryption key, the encryption key generated using a user secret factor within the biometric sample as an input to a password authenticated key exchange protocol;
match the user identifier with a stored user secret in the database;
generate a decryption key using the stored user secret as an input to the password authenticated key exchange protocol, the stored user secret retrieved based on the user identifier;
decrypt the encrypted authentication data message using the decryption key;
extract the user secret from the biometric sample;
authenticate the user by matching the extracted user secret with the stored user secret; and
authenticating, by the computing system, identity of the user by matching the decrypted biometric sample with a biometric reference template associated with the user identifier, wherein a subsequent communication with the user and the computing system is encrypted using the user secret factor.

12. The system of claim 11, wherein the instructions are further configured to cause the server system to:
receive a biometric reference sample from the user;
generate a biometric reference template based on biometric characteristics extracted from the biometric reference sample;
associate the user identifier with the biometric reference template; and
store the biometric reference template and the associated user identifier in the database.

13. The system of claim 12,
wherein the biometric reference sample is received during an enrollment procedure, and
wherein the enrollment procedure further includes receiving the user secret from the user.

14. The system of claim 13, wherein the user secret received during the enrollment procedure includes a typed password.

15. The system of claim 11,
wherein the encrypted authentication data message further includes an object identifier, and
wherein authenticating the user further includes matching the object identifier with a stored object identifier associated with the user identifier.

16. The system of claim 15, wherein the object identifier is associated with a physical object used to capture the biometric sample.

17. The system of claim 11, wherein the instructions are further configured to cause the server system to:
transmit, to a biometric service provider computing system, a matching request, the matching request including the user identifier and the biometric sample; and
receive, from the biometric service provider computing system a binary match value, the binary match value relating to a comparison of the biometric sample to a provider biometric reference template stored on a database of the biometric service provider computing system.

18. The system of claim 11, further comprising:
a locking mechanism; and
wherein the instructions are further configured to cause the server system to transmit, to the locking mechanism, an unlock command upon positively authenticating the user.

19. The system of claim 11, wherein the encryption key is generated using a commutative encryption algorithm.

20. The system of claim 11, wherein the encryption key is a symmetric encryption key generated using a Diffie-Hellman encryption algorithm.

* * * * *